United States Patent Office 2,912,412
Patented Nov. 10, 1959

2,912,412

AZIRIDINE-PHENOLIC POLYMERS

Wilson A. Reeves, Metairie, John D. Guthrie, and Leon H. Chance, New Orleans, La., assignors to the United States of America as represented by the Secretary of Agriculture No Drawing. Application December 4, 1956
Serial No. 626,271

15 Claims. (Cl. 260—47)

(Granted under Title 35, U.S. Code (1952), sec. 266)

A non-exclusive, irrevocable, royalty-free license in the invention herein described, throughout the world for all purposes of the United States Government, with the power to grant sublicenses for such purposes, is hereby granted to the Government of the United States of America.

This invention relates to new synthetic polymers, processes for their production and processes of employing these polymers. These new materials are especially suitable for use in the plastics and coating arts.

In general this invention relates to polymers capable of being produced by the reaction of compounds which contains two or more 1-aziridinyl groups,

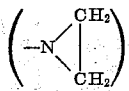

attached directly to non-metallic atoms with compounds which contain one or more phenolic groups.

It is an objective of the present invention to prepare a new class of synthetic materials, more particularly resinous compositions, which have particular utility in the plastics and coating arts e.g. as laminating, impregnating, adhesive, coating, as textile and paper treating materials and as molding compositions. Other objectives of the invention will be apparent to those skilled in the art as the description of the invention proceeds.

We have discovered that compounds which contain two or more 1-aziridinyl groups attached directly to a non-metallic atom react with compounds that contain one or more phenolic groups to produce polymers. Such polymers contain the characteristic reoccurring connecting structures,

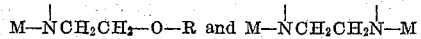

wherein M is a non-metal of the group P and S and wherein R is an aryl group.

Such polymers can be produced in the form of liquids or solid synthetic resins. They are flame resistant and when deposited in the interstices of hydrophilic fibrous organic materials, they reduce the flammability of such products. When deposited as surface coatings on non-hydrophilic materials, they form flame-resistant coatings.

1-Aziridinyl compounds suitable for use in this invention are compounds that contain the following structures:

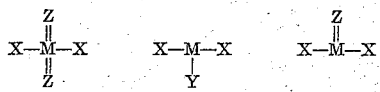

and

where Z is oxygen, sulfur or nitrogen; X is

Y is

a dialkyl amine, an alkyl, an alkylene or an aryl group; M is phosphorus or sulfur. Some typical examples of compounds are:

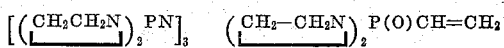

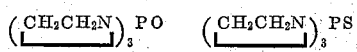

and

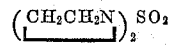

These 1-aziridinyl compounds can be prepared by substantially any of the known processes for producing such compounds. In general, they are prepared by reacting ethylenimine with the corresponding non-metallic halide in the presence of an acid acceptor such as trimethyl amine.

Phenolic compounds suitable for use in this invention include substantially any compound or polymer that contains one or more hydroxy groups attached to aromatic rings. Some specific phenols that can be used in practicing the present invention are given below:

Phenol
Ortho-, meta- and para-cresol
Para-bromophenol
Ortho-nitrophenol
Meta-fluorophenol
Penta-chlorophenol
Para-hydroxydiphenyl
3-n-pentadecylphenol, $HOC_6H_4(CH_2)_4CH_3$
Resorcinol
Catechol
Phloroglucinol
Para-aminophenol
Hydroquinone
Alpha-naphthol The invention is not limited to the use of these phenols.

The proportions of reactants can be varied widely depending, for example, upon the particular properties desired in the final product. The amount of phenolic compound used may be only about 2% of the amount of aziridinyl compound used or it may be a much greater proportion. Penols enter the reaction with aziridinyl compounds almost quantitatively when they are used in quantities not to exceed about one phenolic hydroxyl group per aziridinyl group.

The reaction can be carried out with or without a solvent. If both the phenol and aziridinyl compounds are solids they can be fused together; if either the acid or aziridinyl compound is a liquid at room temperature, the solid component may be dissolved in the liquid component. In many cases it is preferable to carry out the reaction in a solvent. Suitable solvents include water and most common organic solvents that dissolve the reactants. Water, acetone, benzene, and ethanol have been found to be especially good solvents. Although ethanol or other alcohols react with the aziridinyl compounds, the reaction of 1-aziridinyl compounds with phenols is much faster at a given temperature, therefore, the reaction may be carried out in alcoholic solvents with only slight or no modification of the 1-aziridinyl-phenolic polymer.

The temperature of the reaction can be varied depending, for example, upon the particular reactants employed, the rapidity of reaction wanted, the particular properties desired in the reaction product, and other factors. For example, the reaction of para-cresol with tris(1-aziridinyl)phospine sulfide may be carried out at 25° C. for a period of 8–12 hours to form a gel or the same reaction may be carried out in 10–20 minutes at 120° C. In general, the polymers described in this invention are prepared at a temperature ranging from about 10° C. up to about 150° C.

The following examples are given by way of illustration and not by way of limitation of this invention. All parts and percentages are by weight. For convenience the compound, tris(1-aziridinyl)phosphine sulfide and tris(1-aziridinyl)phosphine oxide are referred to as APS and APO respectively.

EXAMPLE 1

Reaction of resorcinol with APS

Two parts of APS was dissolved in 7 parts of benzene and then a benzene solution containing 1.5 parts of resorcinol was added to the APS solution. The combined solution was concentrated on a steam bath until a thick syrup formed. The temperature of the syrup did not exceed the boiling point of benzene. A portion of the syrup was spread out on a sheet of glass and again heated on the steam bath. Within 20 minutes a clear, very tough resin formed on the glass. The resin was insoluble in water, benzene, and acetone. It was flame resistant.

The remainder of the above syrup was heated on the steam bath in a beaker. In about 40 minutes it gelled. It was heated for a total of 1.5 hours at which time it was a very tough clear resin. The yield of insoluble polymer obtained was 98% based upon the weight of resorcinol and APS used. The polymer contained 8.72% phosphorus and 11.46% nitrogen.

A similar resin was made by using acetone to dissolve the reagents. The tough polymer obtained would soften when heated to 140–150° C.

EXAMPLE 2

Reaction of para-bromophenol with APS

Two parts of p-bromophenol were dissolved in 7 parts of benzene, then 2 parts of APS was dissolved in the solution. The clear solution was divided into two aliquots. One was used to treat fabric as shown below, and the other was placed on a steam cone in an open beaker and heated to about 70° C. After 4 hours the product was a water-clear very viscous material. It was polymerized further as follows:

(A) One tenth part of the viscous polymer was heated 5 minutes at 150° C. to produce a hard, tough, slightly flexible water-clear resin. When it was heated an additional 10 minutes at 150° C., the polymer was flexible at 150° C. but became less flexible as it was cooled and was brittle before it reached 27° C.

(B) The remaining part of the viscous material was heated 30 minutes at 110° C. to produce a tough water-clear polymer.

The combined weight of the resin produced in "A" and "B" above represented over 90% conversion of monomers to polymer. The product produced in "B" above contained 8.5% phosphorus, 22.58% bromine, 8.68% sulfur and 10.64% nitrogen. The resin would not support a flame.

The other aliquot of the clear solution was used to pad a 4 oz. cotton fabric. The wet fabric was dried at 60–70° C. then heated at 140° for 5 minutes. The fabric contained bromine, phosphorus, nitrogen and sulfur.

EXAMPLE 3

Reaction of phloroglucinol with APO

Three parts of APO and 3 parts of phloroglucinol were dissolved in acetone. The clear solution was placed on a steam cone and heated to distill (from an open beaker) the solvent. After about 1 hour a clear gel was formed, then after an additional hour a hard clear resin had formed. It was insoluble in water, acetone and in benzene. The resin was broken into lumps then finely ground. The ground sample was thoroughly extracted with water. The resin contained 9.44% phosphorus and would not support a flame. When held in an open flame, the resin charred and swelled to about 10 times its volume.

We claim:

1. A process for producing polymeric reaction products of compounds containing at least two 1-aziridinyl groups with phenols, in which product a nitrogen atom is directly connected to a pentavalent phosphorus atom, which comprises mixing a compound selected from the group consisting of a 1-aziridinyl phosphine oxide containing at least two 1-aziridinyl groups, a 1-aziridinyl phosphine sulfide containing at least two 1-aziridinyl groups, and mixtures thereof with a phenol, the proportions of phenol varying from 2% of the aziridinyl compound to one phenolic hydroxyl group per aziridinyl group, and permitting the 1-aziridinyl compound and the phenol to react with each other until a polymeric reaction product is produced.

2. The process of claim 1 wherein the phenol has a formula $R(OH)_x$ in which R is an aromatic nucleus and $x$ represents an integer from 1–3.

3. The process of claim 2 wherein the mixture of the 1-aziridinyl compound and the phenol is heated to a temperature of from about 10° C. to about 150° C. until a polymeric reaction product is produced.

4. The process of claim 2 in which the reaction is carried out in the presence of a solvent.

5. The polymeric reaction product obtained by the process of claim 3.

6. The polymeric reaction product obtained by the process of claim 1.

7. The polymeric reaction products of compounds containing at least two 1-aziridinyl groups with phenols obtained by heating, to a temperature of from about 10° to about 150° C., a mixture of a compound selected from the group consisting of a 1-aziridinyl phosphine oxide containing at least two 1-aziridinyl groups, a 1-aziridinyl phosphine sulfide containing at least two 1-aziridinyl groups, and mixtures thereof with a phenol of the formula $R(OH)_x$, where R is an aromatic nucleus and $x$ is an integer from 1 to 3, to cause said aziridinyl compound and said phenol to react with each other to form a polymeric reaction product, the proportions of phenol varying from 2% of the aziridinyl compound to one phenolic hydroxyl group per aziridinyl group.

8. The process which comprises heating a mixture of tris (1-aziridinyl) phosphine sulfide and resorcinol until a resinous polymeric reaction product between the components of said mixture is formed, the proportions of resorcinol varying from 2% of the tris (1-aziridinyl) phosphine sulfide to one phenolic hydroxyl group per aziridinyl group.

9. The resinous polymeric reaction product obtained by the process of claim 8.

10. The process which comprises heating a mixture of tris (1-aziridinyl) phosphine oxide and phloroglucinol until a resinous polymeric reaction product between the components of said mixture is formed, the proportions of phloroglucinol varying from 2% of the tris (1-aziridinyl) phosphine oxide to one phenolic hydroxyl group per aziridinyl group.

11. The resinous polymeric reaction product obtained by the process of claim 10.

12. The process which comprises heating a mixture of tris (1-aziridinyl) phosphine sulfide and p-bromophenol until a resinous polymeric reaction product between the components of said mixture is formed, the proportions of p-bromophenol varying from 2% of the tris (1-aziridinyl) phosphine sulfide to one phenolic hydroxyl group per aziridinyl group.

13. The resinous polymeric reaction product obtained by the process of claim 12.

14. A composition for use in the production of molded synthetic resins which comprises a homogenous liquid mixture comprising a phenol and an aziridinyl compound selected from the group consisting of poly (1-aziridinyl) phosphine oxides, poly (1-aziridinyl) phosphine sulfides, and mixtures thereof, the proportions of phenol varying from 2% of said aziridinyl compound to one phenolic hydroxyl group per aziridinyl group.

15. A process for rendering cellulosic fibrous materials flame-resistant which comprises impregnating a cellulosic fibrous material with a homogeneous liquid mixture comprising a phenol and an aziridinyl compound selected from the group consisting of poly (1-aziridinyl) phosphine oxides, poly (1-aziridinyl) phosphine sulfides, and mixtures thereof, the proportions of phenol varying from 2% of said aziridinyl compound to one phenolic group per aziridinyl group, and heating the impregnated material to complete the reaction to produce in said material an insoluble resinous polymeric reaction product of said phenol and said aziridinyl compound.

References Cited in the file of this patent

UNITED STATES PATENTS

| | | |
|---|---|---|
| 2,606,901 | Parker | Aug. 12, 1952 |
| 2,654,738 | Lecher | Oct. 6, 1953 |
| 2,672,459 | Kuh | Mar. 16, 1954 |
| 2,682,521 | Coover | June 24, 1954 |

FOREIGN PATENTS

| | | |
|---|---|---|
| 854,651 | Germany | Nov. 6, 1952 |
| 863,055 | Germany | Jan. 15, 1953 |
| 888,853 | Germany | Sept. 7, 1953 |